Patented July 17, 1934

1,967,024

UNITED STATES PATENT OFFICE 1,967,024

INSECTICIDE

Stewart C. Fulton, Elizabeth, N. J., assignor to Stanco, Incorporated

No Drawing. Application June 6, 1929, Serial No. 369,011

10 Claims. (Cl. 167—24)

This invention relates to an improved insecticide in which the insecticide power of a pyrethrum extract is fortified or modified by the addition of rotenon. The invention will be fully understood from the following description and the examples given therein by way of illustration.

Pyrethrum extracts prepared by various methods have been known and used as insecticides for many years. I use such pyrethrum extract as the starting material for my improved insecticide. I may prepare it by extracting pyrethrum flowers with 8 times their weight of kerosene and decolorizing the obtained solution with 3% of its weight of chemically prepared absorptive clay, such as "Filtrol". I prefer to use this method, which is described in my patent application Serial No. 322,974, since it gives a colorless pyrethrum extract which can be used as a household insecticide.

An insecticide thus prepared is quite satisfactory, but is improved to a substantial extent by dissolving a small amount of rotenon in the kerosene extract of pyrethrum, and this constitutes my invention.

Rotenon is a white crystalline compound of melting point 163° C. and having a probable empirical formula $C_{23}H_{22}O_6$. It may be prepared from derris elliptica or other source materials. I have found that by dissolving 0.025% by weight of rotenon in the above mentioned pyrethrum-kerosene extract an insecticide of superior quality was obtained which had not only a quick paralyzing but also a deadly killing action on the insects. The above mentioned amount of rotenon constitutes about the limit of solubility of this compound in kerosene-pyrethrum extract. In case it is desired to dissolve a higher percentage of rotenon it is necessary to use a mixed solvent. If for instance 1% by weight of chloroform is added to the pyrethrum-kerosene extract 0.1% by weight of rotenon is soluble in it, i. e., four times as much as in the absence of chloroform.

Instead of pure rotenon I may employ an extract containing rotenon. Thus I may extract dry derris roots with benzol and use this extract for admixture with the pyrethrum base insecticide. Although this method eliminates a great deal of work connected with the preparation of crystalline rotenon it is usually preferable to use the latter, since it allows an exact dosing of the added rotenon. A further advantage of using crystalline rotenon in such combination rather than the total extract rests mainly on the insolubility of resins in petroleum oils. The total extract consists of rotenon occluded in resins insoluble in kerosene and in such form the rotenon would not be readily accessible to the solvent unless the latter is mixed with other solvents such as chloroform, benzol, etc.

The household insecticides of my invention are substantially anhydrous since they do not contain water except possibly such minute amounts of moisture as may be dissolved in the kerosene.

It will be understood that the above description and examples are by way of illustration and not by way of limitation of my process, and numerous modifications can be made. The ratio of kerosene and other solvents such as chloroform, carbon tetrachloride, etc. may vary to a great extent and it is possible to prepare insecticidal solutions containing pyrethrins and rotenon in which the amount of kerosene is small or even nil. Essential oils may be added to the insecticidal solution if it is desired to improve its odor.

Various other modifications may be made without departing from the spirit of my invention as defined in the following claims. For these, the word pyrethrins is used to designate the active insecticidal principles of the pyrethrum extract. Further, the expression "pure rotenon" is meant to designate crystalline rotenon or a solution containing crystalline rotenon.

I claim:

1. An insecticide comprising pyrethrins and the active extract containing rotenon obtained from a plant.

2. An insecticide comprising pyrethrins and rotenon.

3. An insecticidal solution comprising pyrethrins and rotenon.

4. A solution of pyrethrins in kerosene comprising dissolved rotenon.

5. An insecticidal solution comprising kerosene, pyrethrins, chloroform and pure rotenon.

6. An insecticidal solution according to claim 5 in which the amount of chloroform is approximately one percent and the amount of rotenon does not substantially exceed one tenth of one percent by weight.

7. An improved substantially anhydrous insecticide, comprising pyrethrins and pure rotenon dissolved in a complex solvent comprising kerosene and a minor proportion of a solvent for rotenon which is miscible with kerosene.

8. A substantially anhydrous insecticide comprising pyrethrins and the active extract containing rotenon obtained from a plant.

9. A substantially anhydrous household insecticide comprising pyrethrins, rotenon and a mixed solvent.

10. A method of preparing an insecticidal solution, which comprises extracting dry pyrethrum flowers with about eight times their weight of kerosene and adding to the solution rotenon in amount not substantially more than 0.025% by weight of the solution.

STEWART C. FULTON.